US006373499B1

(12) United States Patent
Acker

(10) Patent No.: US 6,373,499 B1
(45) Date of Patent: *Apr. 16, 2002

(54) AUTOMATED EMPHASIZING OF AN OBJECT IN A DIGITAL PHOTOGRAPH

(75) Inventor: Kristin Acker, Seattle, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/345,818

(22) Filed: Jun. 30, 1999

(51) Int. Cl.[7] ............................................. G06T 11/60
(52) U.S. Cl. ........................ 345/619; 345/621; 345/841
(58) Field of Search ............................... 345/433, 430, 345/431, 113, 429, 441, 619, 621, 667, 473, 841, 845, 638; 348/584; 382/129, 294

(56) References Cited

U.S. PATENT DOCUMENTS 4,872,056 A * 10/1989 Hicks et al. ................ 348/584
5,982,350 A * 11/1999 Hekmatpour et al. ....... 345/113
5,990,901 A * 11/1999 Lawton et al. .............. 345/429
6,081,611 A *  6/2000 Linford et al. .............. 382/128
6,169,815 B1 * 10/2000 Aoki et al. .................. 382/100
6,154,600 A * 11/2000 Newman et al. ............... 386/4
6,154,601 A * 11/2000 Yaegashi et al. ............. 386/52

OTHER PUBLICATIONS

*Adobe Printshop Version 4.0 User Guide*, Adobe Systems Incorporated, 1991, Chapters 7 and 12, pp. 143–169, 279–301.*

* cited by examiner

*Primary Examiner*—Matthew Luu
*Assistant Examiner*—Thu Thao Havan
(74) *Attorney, Agent, or Firm*—Leydig, Voit & Mayer, Ltd.

(57) ABSTRACT

A method of image data manipulation guides a beginning computer user through the process of applying an emphasizing effect to an object in an image, so that the beginning user who was previously unaware of the existence of such an effect, or of the mechanics of creating such an effect, may nonetheless emphasize an object in an image.

17 Claims, 15 Drawing Sheets

"Black and White, Darken, Lighten, and Desaturate Background Effects": These transforms apply to the effected pixels the following matrix operations.

The pixel values (source and result) are treated as 4-element row vectors (the red, green, blue, and alpha channels being the elements).

R4_Result_Pixel =
        (M4_NprgbNYcc*M4_8rgbNPrgb).Invert()*
            M4_Effect*
        (M4_NprgbNYcc*M4_8rgbNPrgb) *
            R4_Source_Pixel Where the M4_prefix designates 4x4 matrices and the R4_prefix designates 4_element row vectors.

The values of the matrices are

M4_NprgbNYcc:       //Normalized Photo RGB to Normalized Photo YCC
[0.2988843217850853  0.5871990604815032  0.1139166177334116  0]
[-0.2988843217850853  -0.5871990604815032  0.886083382266588  0]
[0.7011156782149147  -0.5871990604815032  -0.1139166177334116  0]
[0        0        0        1]

M4_8rgbNPrgb: //8-bit premultiplied alpha RGBA to normalized Photo RGB
[1./247.1        0        0        0]
[0        1./247.1 0        0]
[0        0        1./247.1 0]
[0        0        0        1./255.0]

M4_Effect:
This matrix depends upon the effect to be applied, and the values are as follows:

Black and White Background:
[1        0        0        0]
[0        0        0        0]
[0        0        0        0]
[0        0        0        1]

Darken Background:
[1        0        0        -0.13877]
[0        1        0        0]
[0        0        1        0]
[0        0        0        1]

Desaturate Background:
[1        0.2015  0.12275  0]
[0        0.25    0        0]
[0        0        0.25    0]
[0        0        0        1]

Lighten Background:
[1        0        0        0.34399]
[0        1        0        0]
[0        0        1        0]
[0        0        0        1]

FIG.14

AUTOMATED EMPHASIZING OF AN OBJECT IN A DIGITAL PHOTOGRAPH

TECHNICAL FIELD

This invention relates generally to digital image processing and, more particularly, relates to automatically applying an emphasizing effect to an object in a digital photographic image.

BACKGROUND OF THE INVENTION

In preparing an image for viewing or publication, it is often desirable to modify the image in some way. Possible modifications include the correction of defects in the image as well as the enhancement of the image. One enhancement consists of emphasizing a selected object in the image. Thus, for example, a user might modify everything within the photograph except the selected object, so that the object stands out by virtue of its differences from the altered background. Alternatively, one might modify the object itself while leaving the remainder of the photograph unaltered, causing the object to stand out by virtue of the modifications.

It is known in the art of photographic processing to produce the aforementioned effects. For example, professional photographers and graphic artists may produce an emphasizing effect by performing custom operations on photographic film, or by performing custom manipulations of digital data corresponding to a photograph. Working with an imaging program on a computer, a skilled graphic artist who is familiar with the emphasizing effect may be able to execute a series of manipulations on an original image to define a selected object, modify the selected object or the original image, and overlay the image and the object. Alternatively, a skilled graphic artist who is familiar with the emphasizing effect may manually mask an object in an image, so that a subsequent modification is applied to all of the image but the masked object. However, there is currently no simple way for a first time or beginning computer user to create this emphasizing effect. For example, a technically unsophisticated user may not even be aware that such an effect is possible.

A method is needed whereby the beginning computer user may be apprised of the possibility of obtaining an emphasizing effect, and may be guided through the manipulations needed to obtain such an effect without the aid of a specialist.

SUMMARY OF THE INVENTION

The present invention enables the neophyte or technically unsophisticated user to obtain an emphasizing effect in a digital image, by listing the effect as one item in a menu of available effects, and by guiding the user through the process of creating the effect, once the user has selected the effect from the menu. In particular, if the user has not yet selected a feature in the image to emphasize, the user is automatically prompted to cut out the feature of interest, and to return to the special effects menu after having done so. At this point, the user may select a particular type of emphasizing effect from a visual menu of such effects, and the selected effect is automatically applied. This automatic application of the emphasizing effect may entail automatically visually altering the image background around the feature of interest, or may alternatively entail automatically visually altering the feature of interest itself. Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 14 is an illustration of several potential transforms usable to implement the invention.

DETAILED DESCRIPTION OF THE INVENTION

Figure 1:
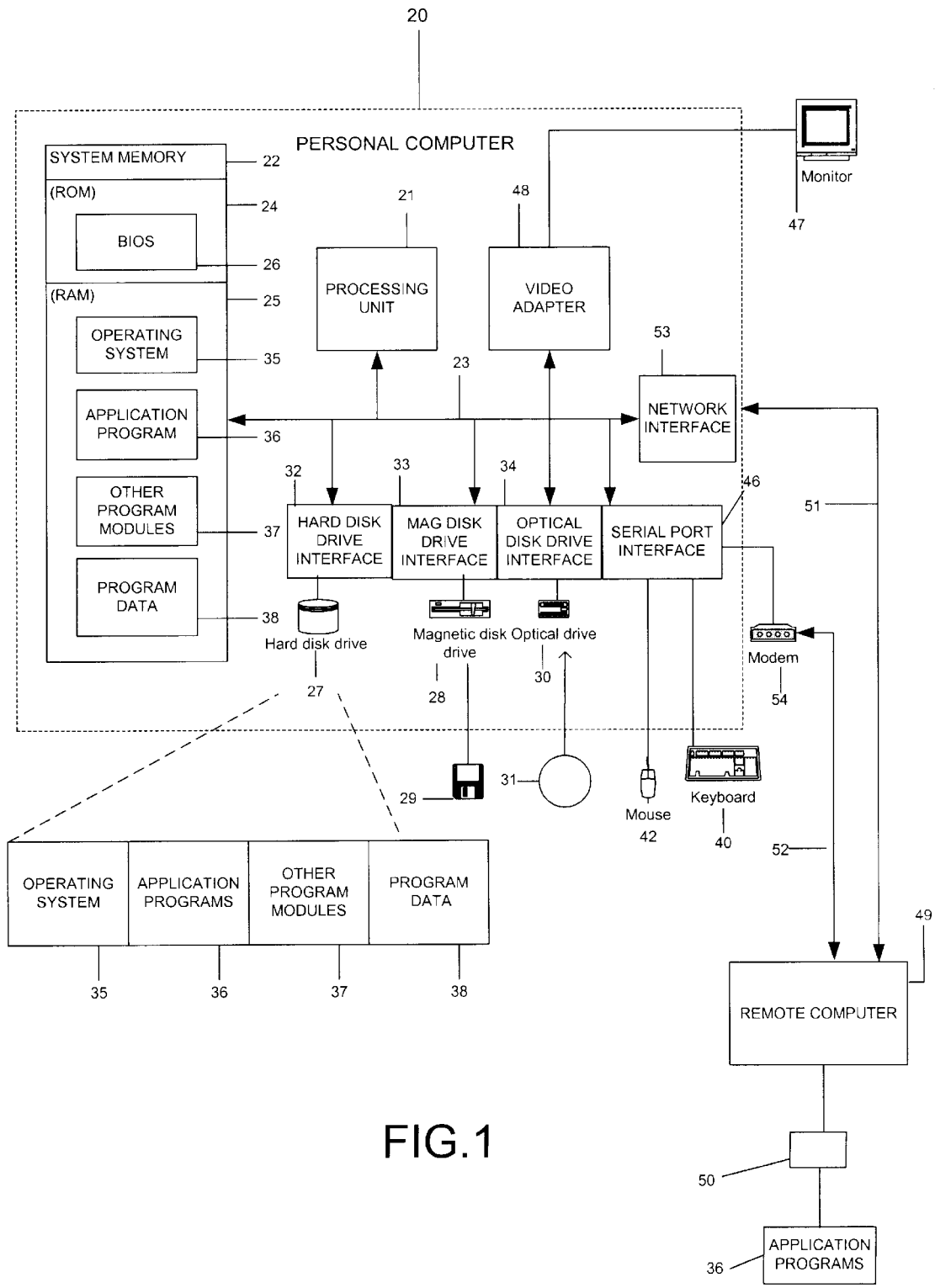
FIG. 1 is a block diagram generally illustrating an exemplary computer system usable to implement the invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 preferably further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
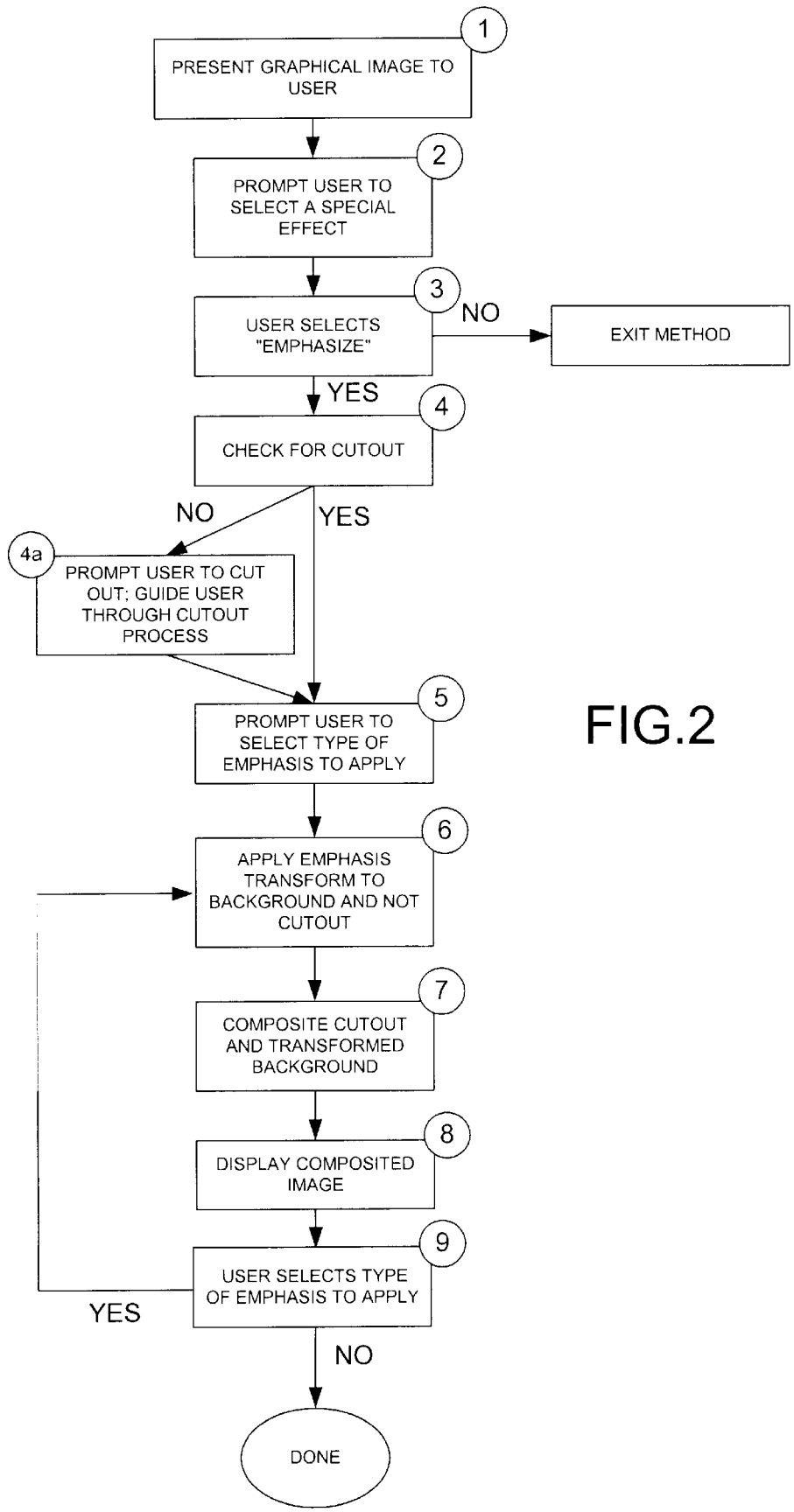
FIG. 2 is a block diagram illustrating the process flow of a method according to an embodiment of the invention.
Figure 3:
FIG. 3 is a simulated view of an exemplary user interface according to an embodiment of the invention, wherein the user has selected the "Special Effects" icon.

In accordance with an embodiment of the invention, a user of the computer 20 is presented with an image on the monitor 47 or other display device associated with the computer 20, as depicted in step one of FIG. 2. The displayed image preferably corresponds to image data entered into the computer by the user via scanning of a conventional photograph, via transfer from a capture device such as a digital camera, or via transfer from an accessible file. The user may desire to apply a special effect to the image data, and accordingly, the user is prompted to select a special effect, in step 2. The prompt is preferably an icon or selectable object with a visible indication of its purpose, such as the selected "special effects" icon in FIG. 3.

Figure 4:
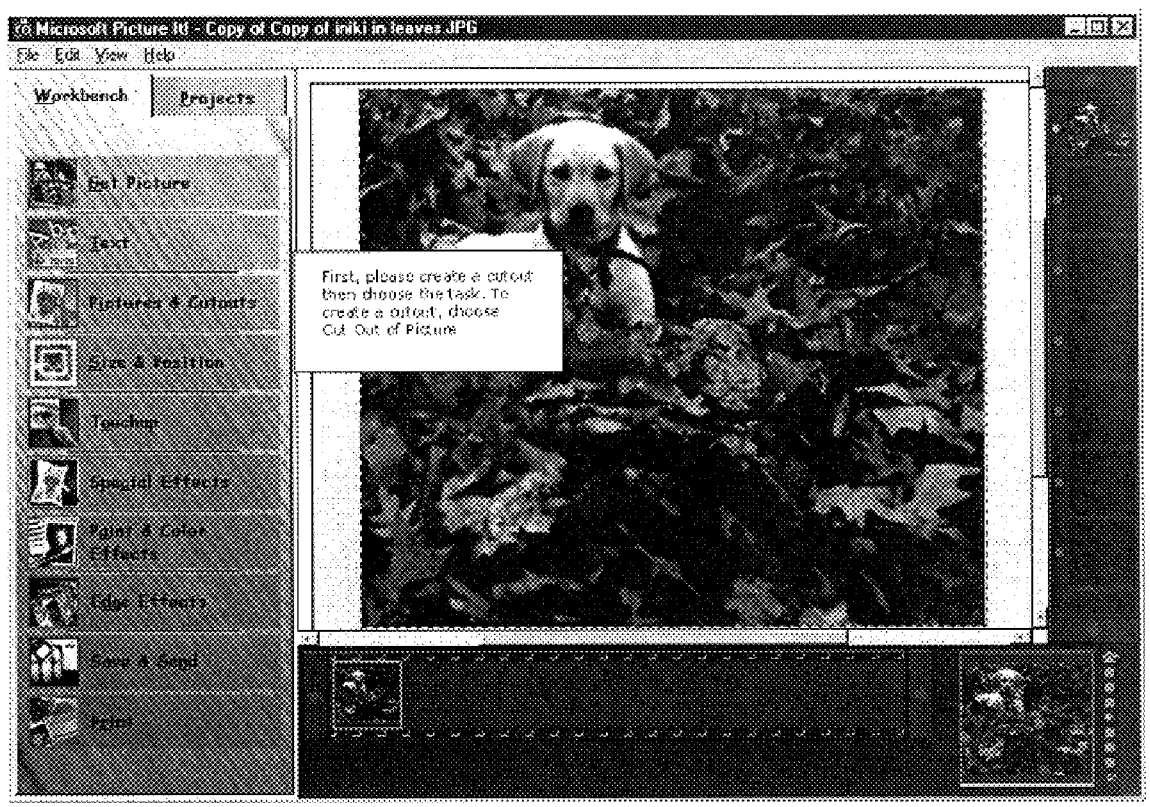
FIG. 4 is a simulated view of an exemplary user interface according to an embodiment of the invention, wherein the user is prompted to create a cut out.
Figure 5:
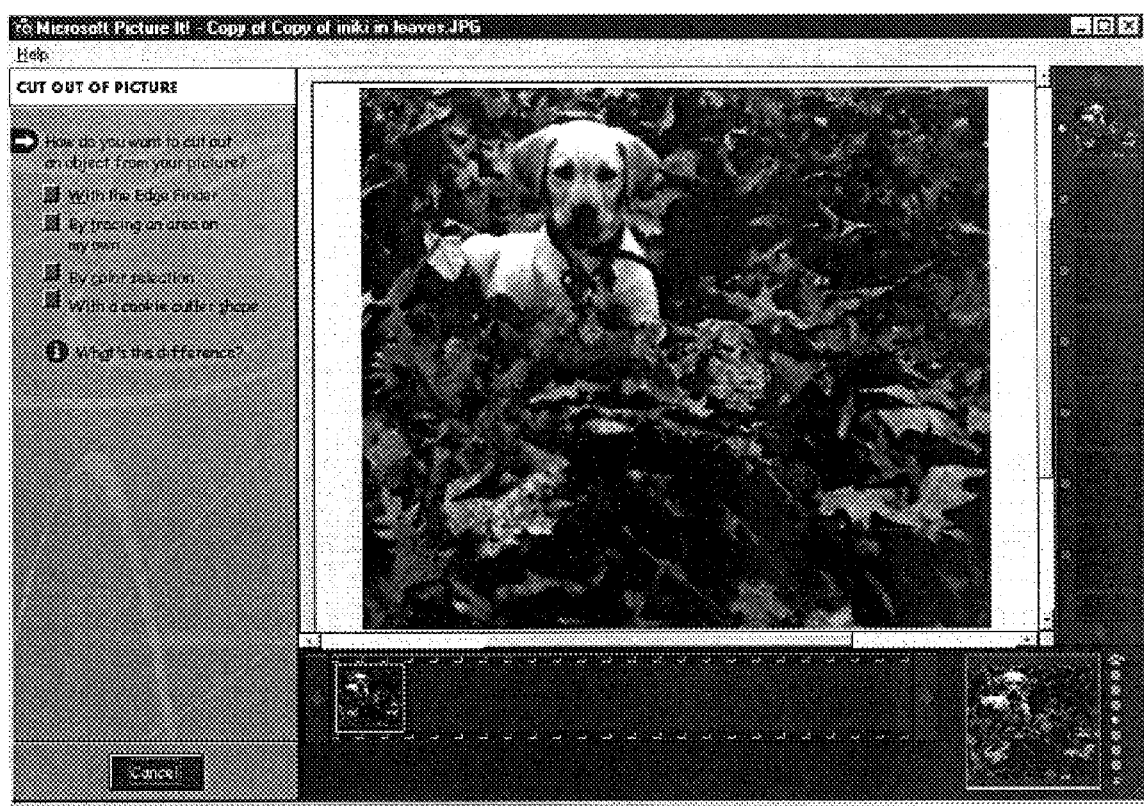
FIG. 5 is a simulated view of an exemplary user interface according to an embodiment of the invention, wherein the user is prompted to select a method of creating a cut out.
Figure 6:
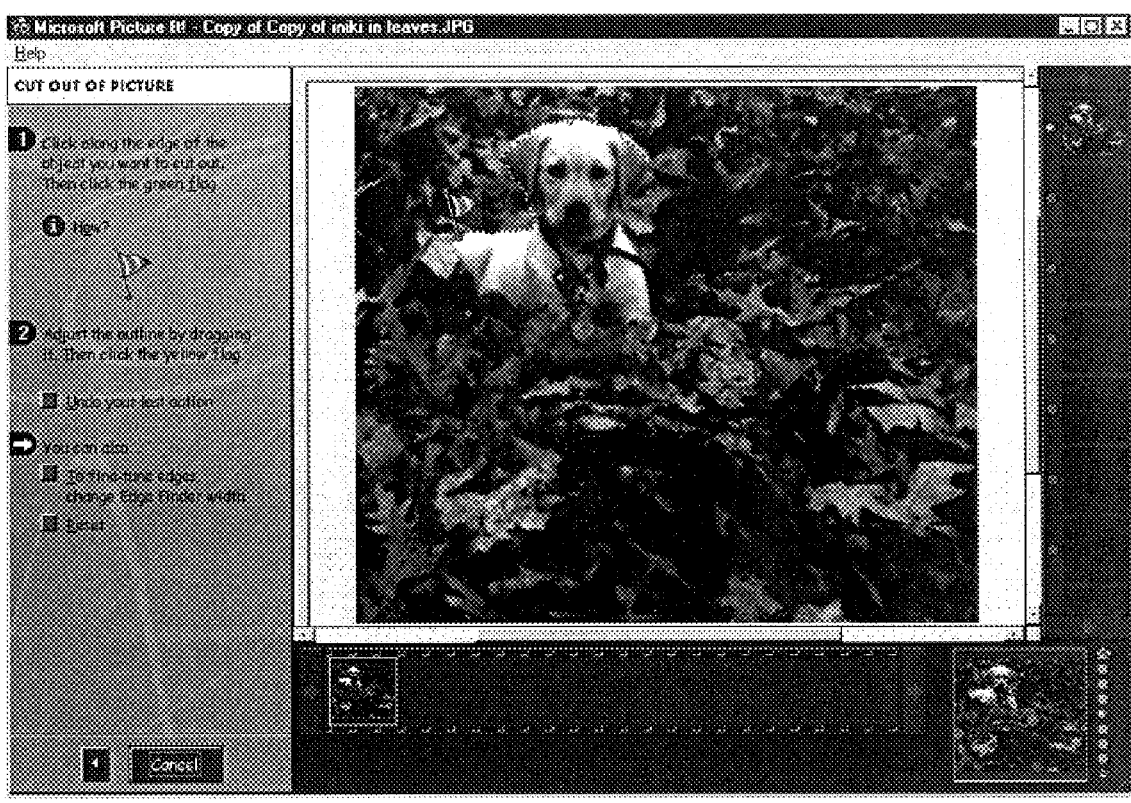
FIG. 6 is a simulated view of an exemplary user interface according to an embodiment of the invention, wherein the user is guided to create a cut out using a particular method.
Figure 7:
FIG. 7 is a simulated view of an exemplary user interface according to an embodiment of the invention, wherein the user is guided to create a cut out using a particular method.

If the user does not desire to select a special effect, or if the special effect selected is one other than "emphasize," the remaining steps depicted in FIG. 2 are not executed. However, if the user selects "emphasize," step 3, the image application according to this embodiment of the invention determines in step 4 whether any object or feature within the image has been cut out as the focus of the "emphasize" operation. If it is determined that no feature has been cut out, the user is prompted in step 4a to cut out a feature to be emphasized. As illustrated in FIG. 4, this prompt preferably instructs the user, not only that a cutout is needed, but that the user should reselect the emphasize task once a cut out has been created. The location of the prompt is preferably such that the user is guided to an icon or tool usable to create the cut out. For instance, the prompt appears in FIG. 4 adjacent to the "Pictures & Cutouts" icon. Thus the user is apprised of the necessity of a cut out, and is also guided through the process of obtaining such a cut out. FIGS. 5–7 depict an exemplary manner of guiding the user through the actual process of making the cut out. The user is preferably presented with options for the method of creating the cut out, as in FIG. 5. Having selected a method, the user is preferably guided through the steps of that method. For example, as illustrated in FIG. 6, the user has chosen to create a cut out using the edge finder, and is prompted step by step through the process of using the edge finder to create a cut out. Finally, the user may be presented with a menu of possible refinements to the cut out as in FIG. 7. In the illustrated embodiment, possible refinements include smoothing, adding or removing areas from the cut out, and inverting the selection. As will be described in greater detail hereinafter, the finished cut out is automatically maintained in alignment and registration with the corresponding underlying feature.

Figure 8:
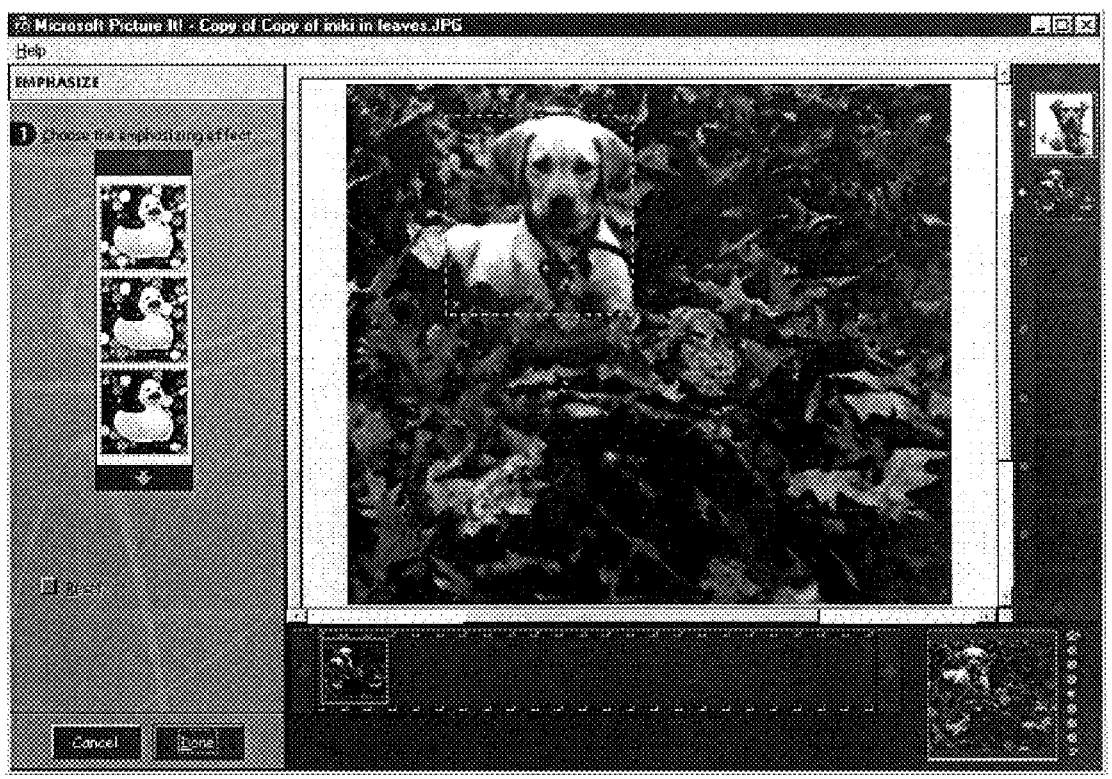
FIG. 8 is a simulated view of an exemplary user interface according to an embodiment of the invention, wherein the user is prompted to select an emphasizing effect to preview.
Figure 9A:
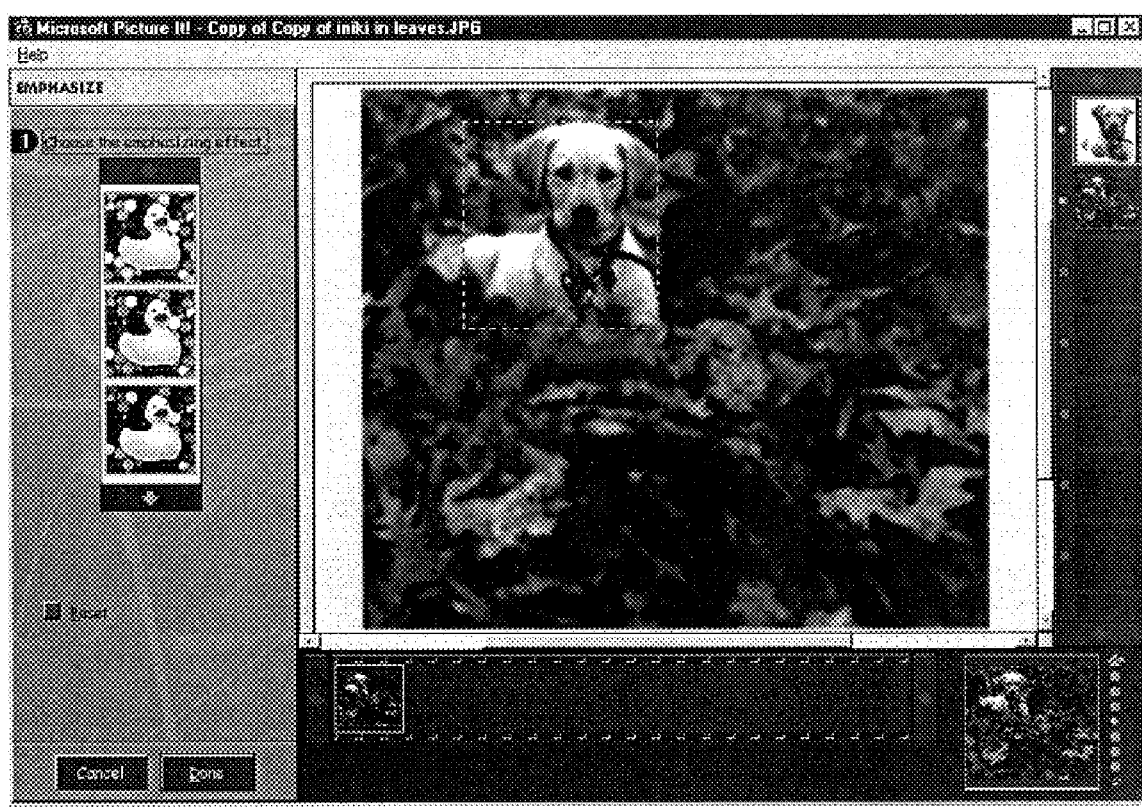
FIG. 9a is a simulated view of an exemplary user interface according to an embodiment of the invention, wherein the user is presented with a preview of the result of applying a particular emphasizing effect.
Figure 9B:
FIG. 9b is a simulated view of an exemplary user interface according to an embodiment of the invention, wherein the user is presented with a preview of the result of applying a particular emphasizing effect.

Once the user has created a cut out, they preferably reselect the "emphasize" task. If a cut out of a feature to be emphasized was already present in the image at step 4, the user need not create another cut out or reselect the task. In step 5, the user is preferably presented with selectable visual examples of different available "emphasize" options, such as "Black and White," "Watercolor," "Pointillist," and so on, as depicted in FIG. 8. Preferably, the name of the option is visible to the user. In a preferred embodiment of the invention, the name of an option appears whenever the cursor is positioned over the visual example of the particular emphasizing effect. Each of these options preferably is operable when selected to visibly change the image background around the cut out in a manner consistent with the option name. Thus, for example, selection of the "Watercolor" option would yield the image with the cut out unaltered and the background made to appear as if it were a watercolor painting. As will be described in greater detail hereinafter, the user is preferably able to reversibly try, or preview, different effects before settling on a desired effect and exiting the task. Accordingly, the user is preferably presented with a preview of the emphasized image after each selection of a different "emphasize" effect. FIGS. 9a and 9b show previews for the "Blur" and "Pointillist" effects respectively. The foregoing sequence of events is illustrated in FIG. 2 as steps 6, 7, 8, and 9.

Figure 10:
FIG. 10 is a simulated view of an exemplary user interface according to an embodiment of the invention, wherein the user has selected a particular emphasizing effect to apply.

When the user is satisfied with the particular "emphasize" effect applied, they may exit the task by selecting an icon such as "done" in FIG. 9b. After exiting the task, the user is presented with the image having the desired emphasis implemented, as illustrated in FIG. 10.

Figure 11:
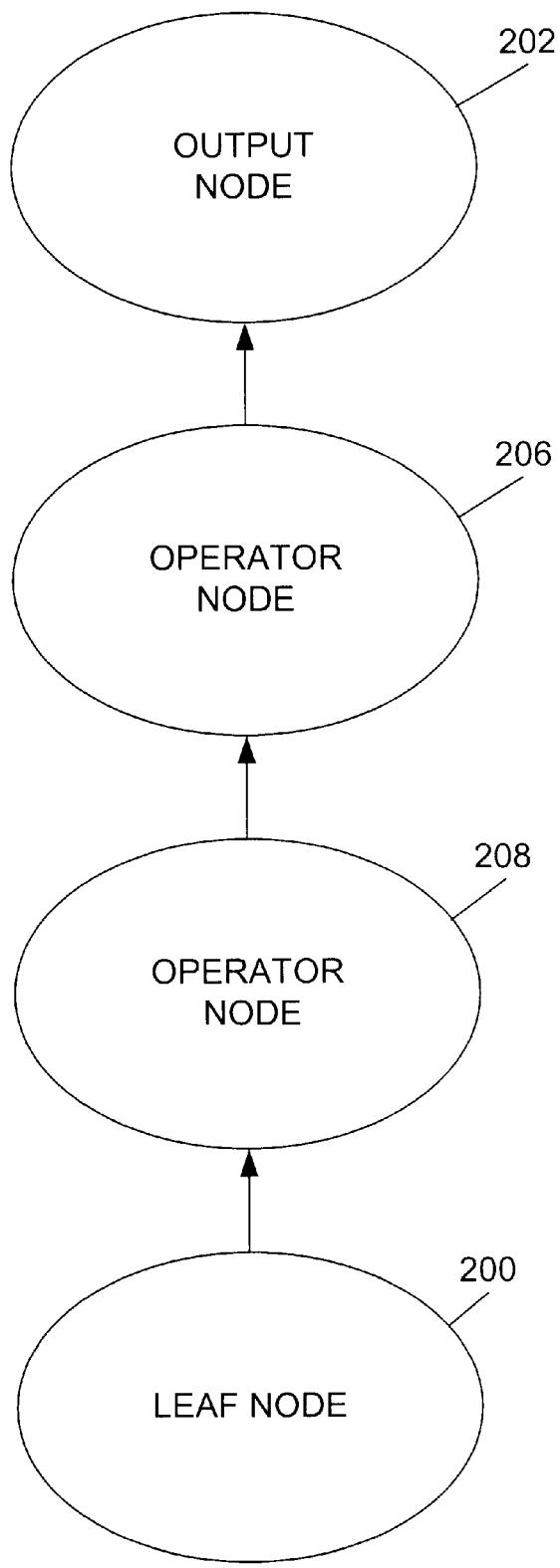
FIG. 11 is a schematic diagram generally illustrating a generic graph-structured architecture.

In a preferred embodiment, a graph structured representation is used to store images both during and after manipulation. The utilization of this structure allows a user to return an image to a previous or original state, or to easily change the particular effect applied to the image. FIG. 11 depicts a schematic of a graph structured representation for a generic document or image. Leaf nodes in the generic graph structure generally correspond to data as originally captured or created by the user. For example, the leaf node 200 may be data representative of a conventional photograph digitally scanned and saved by the user. The output node 202 corresponds to the data after a series of one or more manipulations by the user. Between any leaf nodes and the output node, the graph is populated by operator nodes 206, 208. These operators generally correspond to user initiated transformations, such as "blur" or "rotate."

Additional operators may be automatically inserted into the graph when necessary, and the order of operators in the graph may be automatically altered in order to optimize the execution of the series of operations with respect to execution speed or resource usage. For example, prior to rendering, operators such as "over" and "composite" should be automatically inserted into the graph at the appropriate points if they are not already in the graph. As well, a user may have originally performed steps in an order which requires redundant or inefficient processing. For example, a user may have performed a "blur" or similar pixel-by-pixel operation on the image data prior to scaling the image to a smaller size. In such circumstances, the order of operations is preferably automatically changed to yield a more efficiently executable graph by placing the scale operator prior to the blur operator in the graph.

Figure 12:
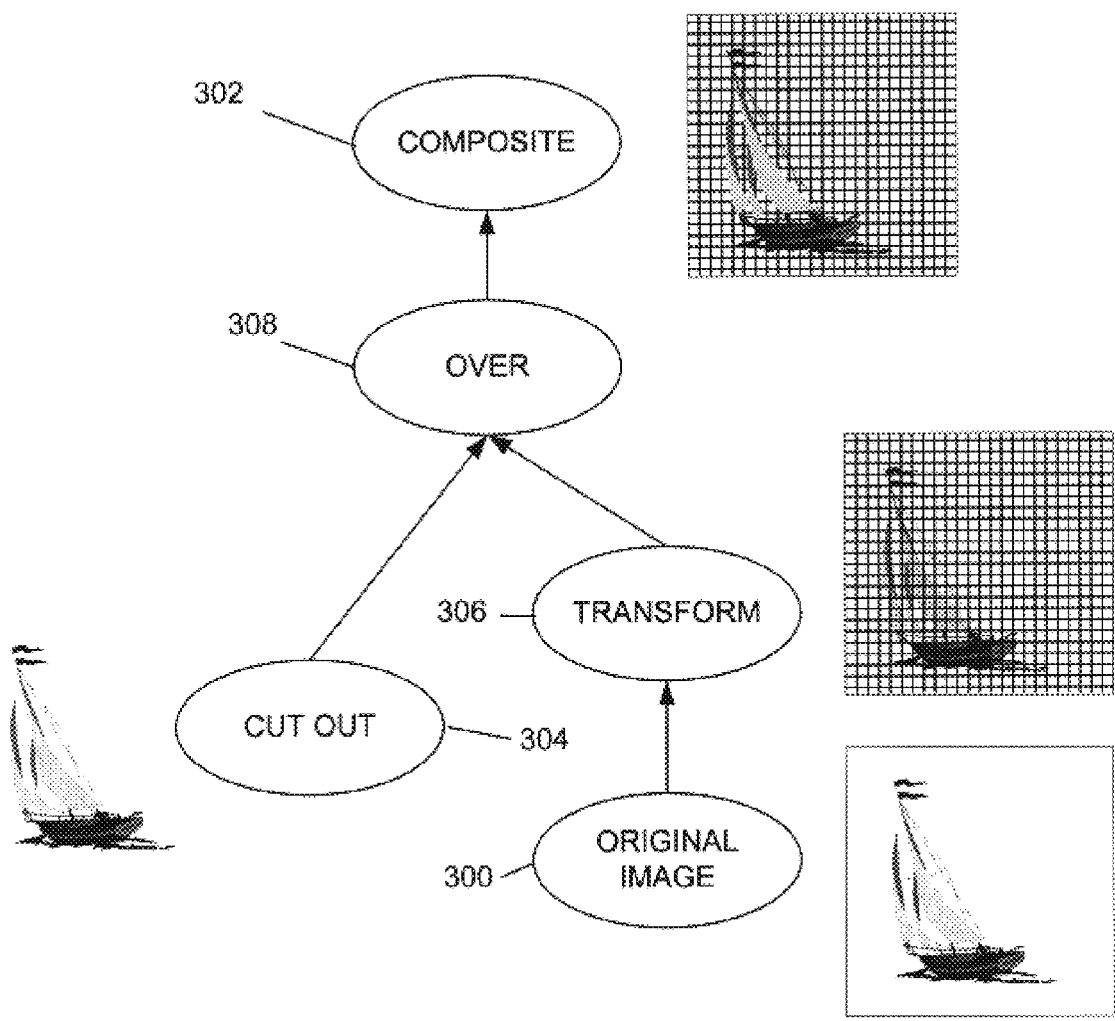
FIG. 12 is a simplified schematic diagram illustrating the graph-structured architecture utilized in an embodiment of the invention.

The graph structured representation of an image wherein a feature has been emphasized according to an embodiment of the invention is shown in FIG. 12. The original and emphasized versions of the image are depicted as leaf node 300 and output node 302. The cut out of the feature to be emphasized is preferably represented in the graph as a leaf node 304, but may equivalently be represented as an operator with associated parameters. Preferably, the cut out is a "sprite," which is a shaped raster image having scale and location properties, and which is generated in this instance by copying the pixels of the selected feature.

In this embodiment, while the sprite itself contains the appropriate $(rgb_\alpha)$ quadruples copied directly from the pixels of the corresponding feature in the original image, as well as the locations of the copied pixels relative to each other, the scale and location properties of the sprite relative to the rest of the image are created and stored as a view transform following the sprite in the graph. The view transform, which is an operator generally used prior to rendering a sprite, takes a sprite as input and performs rotation, scaling, positioning or other functions on the sprite, returning the transformed sprite as output. The position of the sprite may be stored as position parameters associated with the view transform following the sprite of interest. In this manner, an application performing the method according to this embodiment of the invention may employ the view transform to perform the automatic registration of the sprite and the corresponding underlying feature.

As illustrated by the transform operator at node 306, the user has selected an emphasizing effect to apply. Preferably, each time that the graph is loaded or altered, the steps of the graph are automatically re-executed. Thus, when the user selects an effect either initially or as a replacement for a previous effect, the leaf nodes 300 and 304 are restored, and the new transform is applied to leaf node 300. At this point, the transformed output of node 306 and the contents of node 304 are input to an "over" operator in node 308 which functions to determine the priority of the pixels to be rendered. In this example, the "over" operator determines that the pixels of the cut out in node 304 are to be rendered over the pixels of the transformed background resulting from the transform. Finally, the composite operator in node 302 composites the images for rendering. Note that the transform, "over," and "composite" operators preferably only process that portion of the image which is currently being viewed or otherwise accessed, thus saving time and computing resources.

Examples of transforms usable to create an emphasizing effect include "Lighten Background," "Desaturate Background," "Darken Background," "Blur Background," "Black and White Background," "Sepia Tone Background," "Pointillist Background," "Watercolor Background," "Diffuse Glow Background," "Neon Glow Background," and "Fill With a Solid Background" transforms. The listed transforms are merely examples, and accordingly, this list should not be considered exhaustive, nor should any transform in the list be viewed as critical. Many transforms, including some or all of the above, may be accomplished by using the Adobe GALLERY EFFECTS 1.5.1 software distributed by Adobe Systems, Incorporated, or similar plug-in software developed for Adobe PHOTOSHOP. Similar transforms are also available within Adobe PHOTOSHOP itself. The "Blur Background" effect is well known in the art, and may be accomplished using a standard gaussian blur, adapted for use on multiple resolution level images. The "Lighten Background," "Desaturate Background," "Darken Background," and "Black and White Background" transforms are also well known in the art. Additionally, FIG. 14 illustrates methods usable to accomplish each of these transforms, but is not intended to be exhaustive. One skilled in the art will appreciate that there are many methods available to accomplish any of the aforementioned transforms, and all such methods may be used in an implementation of the invention. As well, one of skill in the art will realize that many transforms other than those listed may be used in an implementation of the invention. Accordingly, the invention includes within its scope all such implementations.

As discussed, one beneficial consequence of utilizing the graph structured representation of the modified image is that the original image data is stored as a node in the graph and may be recovered or re-modified as desired. Alternative methods of image history storage may be utilized instead, whereby the transform operates directly on the image data. However, such methods may result in the loss of the original image information when the transformed image replaces that information. This is sometimes referred to as "flattening" the operation into the image data.

Figure 13:
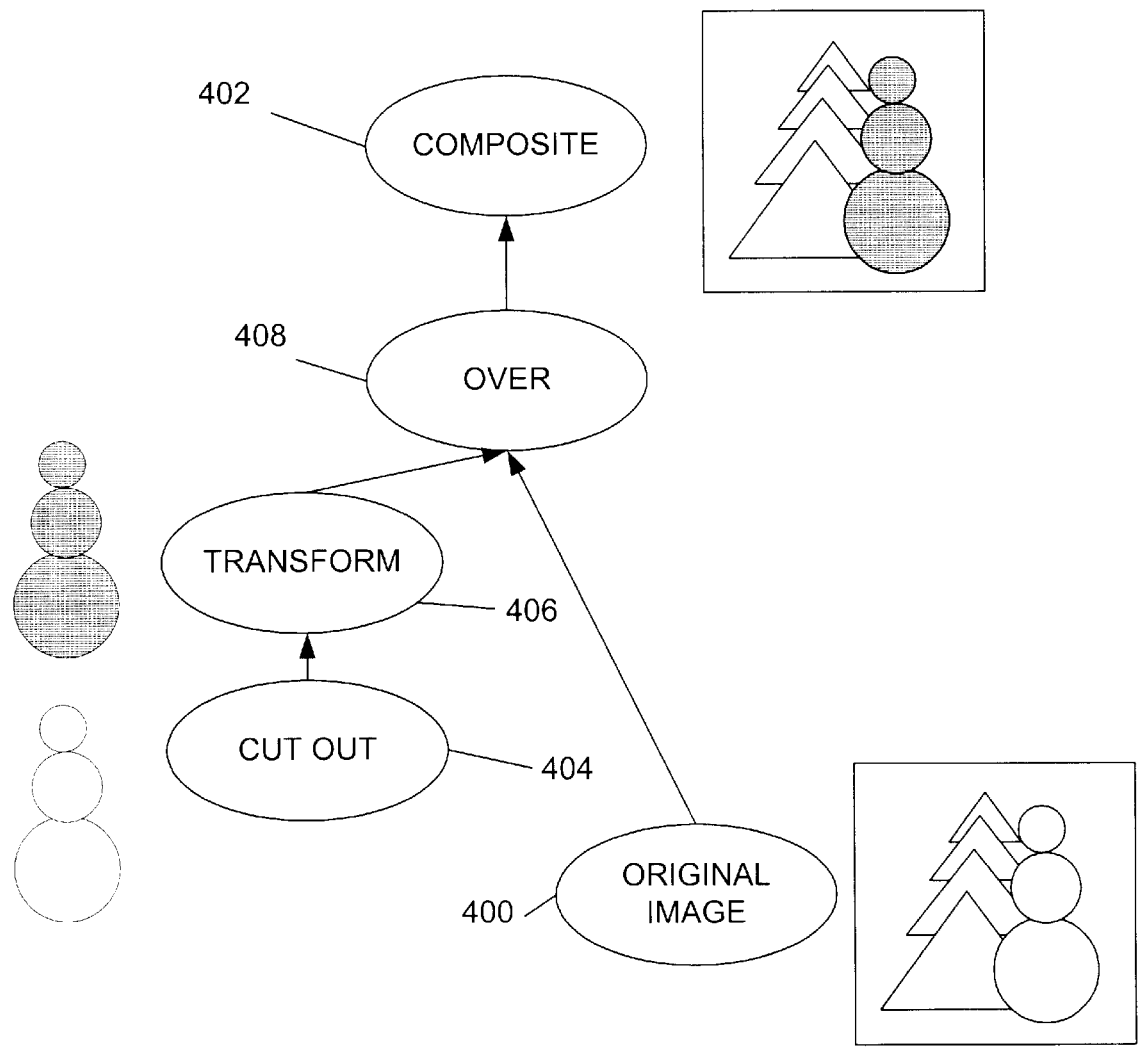
FIG. 13 is a simplified schematic diagram illustrating the graph-structured architecture utilized in an alternative embodiment of the invention.

While the previously discussed embodiment of the invention entails modification of the image background, the invention may alternatively be employed to modify the selected feature while leaving the background unaltered. Thus for example, in this embodiment step 6 and 7 of FIG. 2 would change to reflect the fact that it is the cut out feature itself which is altered, instead of the background. The graph structure of the image would also vary slightly, as illustrated in FIG. 13. In particular, the transform operator node 406 appears in the graph between the cut out node 404 and "over" operator node 408 instead of between the original image node 400 and the "over" operator node 408. The resulting image after compositing at node 402 will show the selected feature emphasized by virtue of the changes applied to the feature.

In view of the many possible embodiments to which the principles of this invention may be applied, it should be recognized that the embodiments described herein with respect to the drawing figures are meant to be illustrative only and should not be taken as limiting the scope of the invention. For example, those of skill in the art will recognize that some of the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

I claim:

1. For use in processing an original image using a computer having a display device, a method of producing an emphasizing effect on a selected object within the original image, wherein the emphasizing effect includes visibly altering all of the material within the original image except the selected object, the method comprising the steps of:

presenting the original image to the user on the display device;

presenting to the user a menu of special effects on the display device, wherein an item in the menu corresponds to the emphasizing effect; and if the user selects the menu item corresponding to the emphasizing effect, prompting the user to perform user steps required to produce the emphasizing effect with respect to the selected object, whereby an altered image is displayed corresponding to the original image with the material in the original image other than the selected object visibly altered in accordance with the emphasizing effect.

2. The method according to claim 1, wherein the step of prompting the user to perform user steps required to produce the emphasizing effect with respect to the selected object further comprises the step of:

presenting to the user a menu of available particular emphasizing effects.

3. The method according to claim 2, wherein the menu of available particular emphasizing effects comprises an exemplary visual representation of the application of each particular emphasizing effect.

4. The method according to claim 1, wherein the step of prompting the user to perform user steps required to produce the emphasizing effect with respect to the selected object further comprises the steps of:

determining whether there is a cut out on the original image; and if there is not a cut out on the original image, prompting the user to create a cut out, whereby a sprite is created corresponding to the selected object and is automatically aligned on the original image in registration with the selected object.

5. The method according to claim 4, further including the steps of:

retrievably storing the altered image as a graph, wherein the original image, the sprite in registration with the selected object, and an operator corresponding to the emphasizing effect are stored as associated graph nodes, so that re-execution of the graph causes the altered image to be rendered.

6. The method according to claim 5, further comprising the steps of:

receiving user input requesting the application of a new emphasizing effect;

altering the graph by replacing the operator corresponding to the emphasizing effect with an operator corresponding to the new emphasizing effect; and re-executing the graph to render a new altered image.

7. For use in processing an original image using a computer having a display device, a method of producing an emphasizing effect on a selected object within the original image, wherein the emphasizing effect includes visibly altering only the selected object, the method comprising the steps of:

presenting the original image to the user on the display device;

presenting to the user a menu of special effects on the display device, wherein an item in the menu corresponds to the emphasizing effect; and if the user selects the menu item corresponding to the emphasizing effect, prompting the user to perform user steps required to produce the emphasizing effect with respect to the selected object, whereby an altered image is displayed corresponding to the original image with the selected object visibly altered in accordance with the emphasizing effect.

8. The method according to claim 7, wherein the step of prompting the user to perform user steps required to produce the emphasizing effect with respect to the selected object further comprises the step of:

presenting to the user a menu of available particular emphasizing effects.

9. The method according to claim 8, wherein the menu of available particular emphasizing effects comprises an exemplary visual representation of the application of each particular emphasizing effect.

10. The method according to claim 7, wherein the step of prompting the user to perform user steps required to produce the emphasizing effect with respect to the selected object further comprises the steps of:

determining whether there is a cut out on the original image; and if there is not a cut out on the original image, prompting the user to create a cut out, whereby a sprite is created corresponding to the selected object and is automatically aligned on the original image in registration with the selected object.

11. The method according to claim 10, further including the steps of:

retrievably storing the altered image as a graph, wherein the original image, the sprite in registration with the selected object, and an operator corresponding to the emphasizing effect are stored as associated graph nodes, so that re-execution of the graph causes the altered image to be rendered.

12. The method according to claim 11, further comprising the steps of:

receiving user input requesting the application of a new emphasizing effect;

altering the graph by replacing the operator corresponding to the emphasizing effect with an operator corresponding to the new emphasizing effect; and re-executing the graph to render a new altered image.

13. A method of modifying an original image on a display device associated with a computer pursuant to a user request, comprising the steps of:

receiving a request from the user to emphasize a feature within the original image;

automatically determining whether the feature is cut out;

if the feature is not cut out, automatically prompting the user to cut out the feature;

automatically creating a sprite corresponding to the cut out feature;

applying an emphasizing effect to the original image; and automatically compositing the image and the sprite such that the sprite is registered visually with the underlying cut out feature to create an altered image.

14. The method according to claim 13, wherein the step of applying an emphasizing effect to the original image comprises the step of visually altering the original image.

15. The method according to claim 13, wherein the step of applying an emphasizing effect to the original image comprises the step of visually altering the sprite corresponding to the cut out feature.

16. The method according to claim 13, further comprising the steps of: retrievably storing the altered image as a graph, wherein the original image, the sprite in registration with the cut out feature, and an operator corresponding to the emphasizing effect are stored as associated graph nodes, so that re-execution of the graph causes the altered image to be rendered.

17. For use in processing an original image using a computer having a display device, a computer-readable medium having thereon instructions for performing steps comprising:

presenting the original image to the user on the display device;

presenting to the user a menu of special effects on the display device, an item in the menu corresponding to an emphasizing effect, wherein the emphasizing effect comprises visibly altering all of the material within the original image except the selected object; and if the user selects the menu item corresponding to the emphasizing effect, prompting the user to perform user steps required to produce the emphasizing effect with respect to the selected object.

* * * * *